May 8, 1945. H. W. ANWAY 2,375,182
MANUFACTURE AND TESTING OF FIBER MATS
Filed Jan. 15, 1940
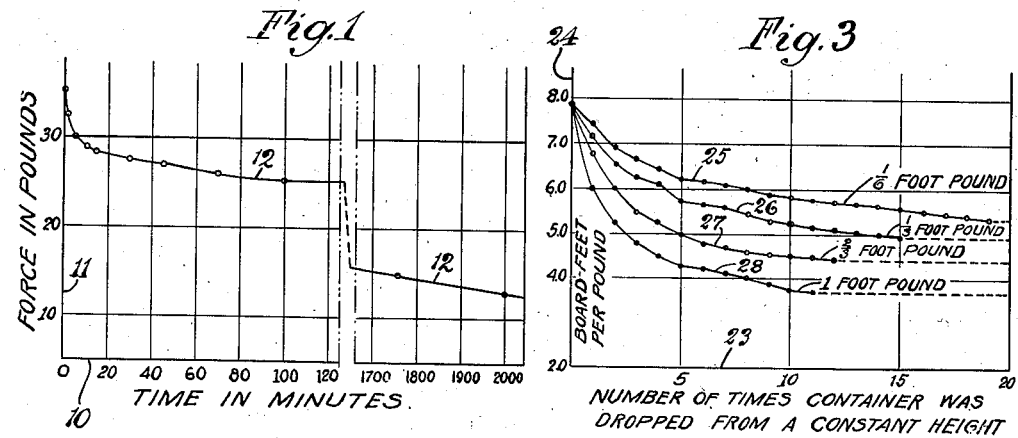
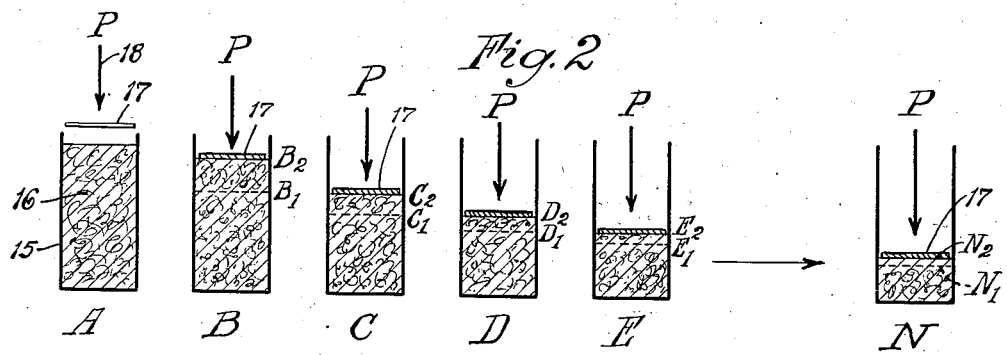
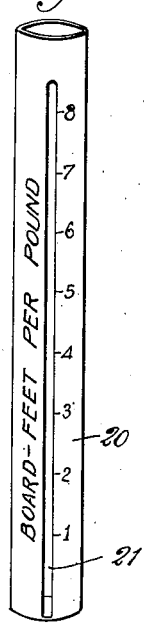
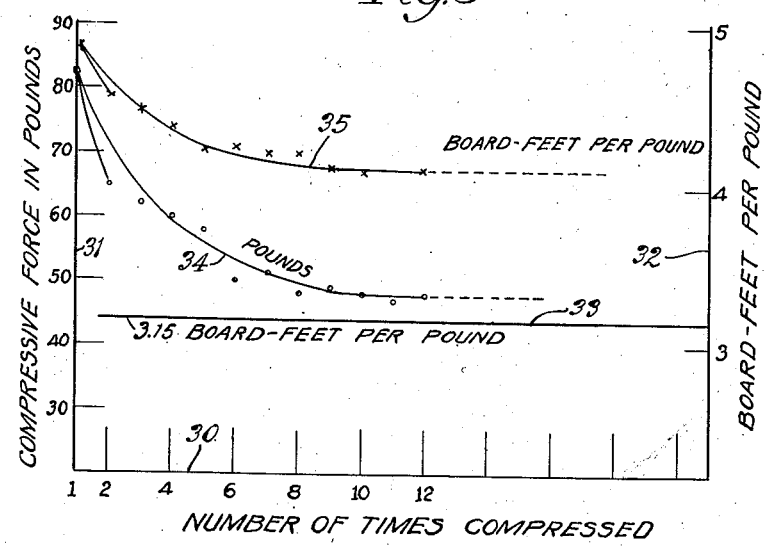
Inventor
Herman W. Anway
by W. Bartlett Jones
Attorney.

Patented May 8, 1945

2,375,182

UNITED STATES PATENT OFFICE 2,375,182

MANUFACTURE AND TESTING OF FIBER MATS

Herman W. Anway, Cloquet, Minn., assignor to Wood Conversion Company, Cloquet, Minn., a corporation of Delaware Application January 15, 1940, Serial No. 313,919

15 Claims. (Cl. 20—4)

The present invention relates generally to felted fiber masses, such, for example, as are used for thermal insulation. In particular it relates to the formation of felted masses which have high resilience and high resistance to settling under impact.

Certain uses of felted fiber as insulation in house walls, in vehicles, such as refrigerator cars, and particularly in refrigerator doors, are attended with the development of settling of the fibers in a space originally packed uniformly with the felted mass. This does not always occur, but it is more likely to occur when effort is made to have a low density of mat. Certain low densities are indicated not only for economy, but also for maximum thermal efficiency. However, where settling occurs, the insulation is destroyed and both objectives of economy (based on insulation effect obtained) and thermal efficiency are lost.

Heretofore, there has been no guiding knowledge to correct such faults, and such correction as has been employed to prevent settling has operated against economic use of fibers and high thermal efficiency.

The present invention is the result of studying fibrous masses to ascertain the fundamental causes of settling under impact. As a result of the studies, it is now possible to determine the settling characteristics of a particular fiber, or a mass thereof, so that a body of felted fibers for insulation or other uses may be formed to resist settling under a specified maximum impact corresponding to the particular use.

Another characteristic of such masses is the elasticity of the felted mass. Heretofore, prevention of settling has been attempted by making felted masses for certain spaces, larger than the space, then to compress the mass, and confine it while compressed into the space. This has not always been successful. It has been found that the mass not only loses elasticity, but that it does settle.

The present invention shows that the elasticity or resilience of a felted mass, and its tendency to settle are related properties. It also shows that as the resistance to settling is increased, the elasticity is made more stable. In the extreme case, the invention enables one to make a felted mass resistant to settling under the force of a prescribed maximum impact or force of compression, and the resilience of the felted mass is a maximum and is permanent, except as the fibers per se may change in resilience by aging, wetting or other factor not related to the mass condition of the fiber.

Studies of fiber masses have also revealed that several blocks of felted fibers, each containing the same volume and weight of the same fibers, may have entirely different characteristics. For example, one may be confined and exert pressure by reason of elasticity therein. The pressure exerted may be high or low, and above a certain minimum value of such pressure, the pressure gradually and automatically reduces itself to such minimum value by change of internal status whereby fibers rearrange and become more highly felted. A second block may be confined and exert pressure less than said value, and maintain it without loss. A third block may be unconfined and be subject to a compression force up to a maximum value with substantially 100% elasticity. The present invention explains these conditions and makes practical use of them.

A mass of fiber may be subjected to an impact or a compression force and then released, so as to be compressed and then expanded. It may be slightly compacted so that after the impact or compression, and expansion, it retains a portion of the compression. This exemplifies elasticity less than 100%. It has been determined that it becomes more highly felted by such an impact or compression. If the same impact force is repeated once again, the same kind of results occur. Numerous repetitions of the same impacts or of the same force, may follow until a point is reached where substantially no additional compacting or felting is produced, and where the expansion after each impact becomes substantially constant. The capacity of the fibers to be felted under that particular impact or compression force becomes satisfied and the mass is considered to be substantially 100% felted. Thus, the resilience of the 100% felted mass is stable and can be utilized. The mass may be compressed by any force or impact not greater than the said repeated ones, such compression maintained, and then released, without loss of the resilience.

If the same initial series of operations are carried out with an impact or compression force of less or of greater force, the same character of results obtain, but the degree of felting is correspondingly less or greater, yet substantially 100% for that force or that impact employed.

Studies of a mass of fibers, which per se have resiliency, have revealed some unusual and unexpected properties. For example, if a mass of loose fibers is compressed and quickly released from the compression, it expands from the resiliency of the individual fibers. However, if in a series of like compressions of masses of like fibers, each compression is halted without release, for varying periods of time, and then released, the extent of expansion or spring-back decreases with the time of halting. In my copending application Serial No. 313,920, filed January 15, 1940, now U. S. Patent No. 2,325,026, issued July 27, 1943, this has been explained in connection with analytical procedures for examining fibers. In explanation for the purposes of the present invention, it is stated that any compression of a mass of fibers beyond its latent elastic limit tends to felt the fibers more and more. However, this is a slow process, and so slow, that any ordinary movement of compression proceeds faster than the felting action. Thus, on halting such compression as above stated the elasticity of the mass tending to expand it, is exerted on the mass while the felting process continues. Thus, the force tending to expand the mass of fibers referred to is gradually dissipated by producing felting.

It follows that a given volume of felted fibers may have an unsaturated capacity for being felted. This capacity operates against having a high degree of elasticity in the mass which will persist during compression. In other words such a mass exhibits a false total resiliency, which is not stable or lasting, and which hides the true elasticity. Therefore, there are numerous objects of the invention.

One object of the invention is to test fibers to determine their tendency to settle, and to determine the conditions which must be imposed to make a fiber mass resistant to settling against an applied force of compression, or impact, of a specified maximum value, or the conditions of a certain usage.

It is an object of the present invention to provide more stability in the resiliency of a felted mass of fibers.

It is another object of the invention to provide a maximum of stable resiliency in a mass of fibers, within certain limitations of applied force.

It is also an object of the invention to provide a mass of fibers with its capacity for felting, under certain conditions, substantially saturated, whereby the resiliency is enhanced and stabilized.

Various other and ancillary objects and advantages of the invention will become apparent from the following description and explanation of the invention.

The invention may best be understood from the following explanations of behaviors, which are hereinbelow described with reference to the accompanying drawing, in which:

Fig. 1 is a plot representing the gradual dissipation of pressure from a confined compressed mass of fibers.

Fig. 2 is a diagrammatic representation of a mass of fibers subjected to repeated applications and removals of the same compressive force.

Fig. 3 is a graph showing the change of volume of three like masses of fiber each subjected to a different impact to cause settling.

Fig. 4 represents a cylinder calibrated to indicate the settling of fibers therein, such as is used to obtain the graphs of Fig. 3.

Fig. 5 is a graph showing the drops in compressive force and spring-back in repeated compressions of the same mass to the same ultimate volume.

A mass of 158 grams of fiber derived from wood is placed in a cylinder of 8 inches diameter and compressed to a volume of 3.15 board feet (one board foot equals 12 x 12 x 1 inches) per pound of fiber, by pressing down a plate over the fiber. The container is set on a scale platform which registers the pressure. The pressure is immediately recorded, and again at later time intervals. It gradually drops, as represented in Fig. 1 wherein axis $10$ represents time, and axis $11$ represents the force as scale readings. Curve $12$ represents the loss of pressure, showing it to be rapid at first, and slower and slower as time goes on. This clearly shows that the original resiliency is not permanent. From other studies made by the applicant, it is known that the fiber is becoming more felted as time goes on.

According to the characteristics of the fiber, the time required to reach equilibrium will be very great, in the order of days, during which the elastic force is gradually expended in causing internal shifting of the fibers to increase its felted character. During this period the fiber has capacity to be felted, and in the end will be substantially 100% felted and 100% elastic against a maximum force corresponding to the residual pressure.

Obviously the above procedure is not a practical one, nor a definite one for use to meet a prescribed condition. To make it useful in filling insulation spaces, it is necesary to relate the original density to the felting and elastic properties of the fiber.

Another operation illustrates the relation of felting and elasticity. In Fig. 2 there is represented a container such as an open-top cylinder $15$ filled with a mass of fiber $16$. A pressing plate $17$ is represented to exert a definite pressure of P pounds represented by arrow $18$. These elements are repeated in the figure without the numerals, except that the fiber levels are given new designations for the purpose of identification of changed conditions. The operations of the series are designated by the stations A, B, etc., to N, the latter representing the last and not necessarily the 13th compression.

The original loose mass $16$ at A is compressed by force P to the $B_1$ level and the plate $17$ is then immediately withdrawn. The mass springs back to level $B_2$. This is repeated again at station C by the same pressure P to reach the level $C_1$, and the spring-back is to level $C_2$. This is repeated numerous times as represented at station N by the conditions indicated at $N_1$ and $N_2$. Actually, the levels $B_1$, $C_1$, $D_1$, to $N_1$, drop less and less at each instance until after $N_1$ there is no change. Also, the levels $B_2$, $C_2$, $D_2$, to $N_2$ drop less and less until there is no change. The spring-back drops less and less until there is a constant spring-back after N for every time force P is applied.

The significance of these data is that at A the fiber has a large capacity to be felted by force P, which capacity becomes saturated at N. The larger spring-back at B for example is due to the unsaturated capacity for felting. As shown in Fig. 1 this observed elasticity in B is but temporary in part, and is convertible to felting. At N, the said temporary elasticity has been converted to felting, and the elasticity from $N_1$ to $N_2$ is a stable or a 100% elasticity. The block $N_2$ when subjected to a force of P or less is substantially 100% elastic, and fully felted.

The practical application of this is the use of the fiber mat N of volume $N_1$ in a confined space to resist any motion under a force of P or less. If block $N_2$ is used in a confined space it will temporarily compress to less volume under an impact or force of P or less, but it will expand again. Thus, where a refrigerator door, for example, is insulated with a mass of the fiber, and the door is subjected to impact having not a force component greater than force P, the fiber should be used at the density of block $N_1$ to be immovable in the door.

This explanation raises the question as to what happens at forces greater than P. The answer is obvious and has been proven by experiments. If the mass of fiber $N_2$ is considered in a new series as A of Fig. 2, wherein the new P is a greater force, the same results are observed.

Fig. 3 is a graph showing the results of a series of impact tests where the force varies. A container in the form of a sheet metal cylinder 20 (Fig. 4) of 4 inches inside diameter has an observation slit 21 therein about $\frac{1}{16}$ inch wide. The slit is calibrated in units reading "board feet per pound" to give directly that value. 150 grams ($\frac{1}{3}$ of a pound) of fiber are used in the cylinder. Such amount of fiber to be tested is placed in the cylinder in a loose low-felted condition. The filled cylinder with one specimen is dropped 6 inches, and the resulting volume read through the slit 21. The impact on the loose fiber is thus $\frac{1}{6}$ foot-pound. It is dropped again and again, and the volume read, until the change is practically nil. This is repeated with other like specimens of the same fiber using a drop of 1 foot to give $\frac{1}{3}$ foot-pound, 2 feet to give $\frac{2}{3}$ foot-pound, and 3 feet to give 1 foot-pound. The results are shown in Fig. 3.

In Fig. 3, the axis 23 represents the number of drops, and axis 24 the board feet per pound read after each drop. Curves 25, 26, 27 and 28 show the results respectively for the 6-inch, 1-foot, 2-foot and 3-foot drops. The full-line portion of each curve represents the process to its substantial end, and observed readings are shown. The dotted-line extensions show the final constant location, for which the observed readings are omitted. They vary but slightly above and below the line. They show definitely that as the impact is increased, the final settled footage decreased. In the early drops the fiber is not completely felted under the force applied thereto by the impact. However, complete felting is accomplished by repetition, which gradually increases the force effective on the fibers.

A practical application of such a procedure is to test a fiber to see what volume a given fiber will have when completely felted to resist settling by any selected maximum impact. Thus, reading from Fig. 3, it is learned that if a refrigerator door is not subjected, as in closing, to an impact in excess of 1 foot-pound, but may be subjected to such impact, the particular fiber tested must be compressed to a footage of not more than approximately 3.75 board feet per pound, and of course preferably slightly less than that limit for a margin of safety. Where the fiber so used is confined, mere compression is sufficient. Where it is not confined, it must be treated so as to completely felt it at that footage for the specified impact.

Figs. 2 and 3 represent ultimately the same thing. The condition of block $N_2$ is the expanded form, which is also read in cylinder 20 and plotted in Fig. 3. In applying the knowledge derived from Fig. 2, it is obvious that where the critical footage of Fig. 3 is employed as determined, it is preferable to pack it in an insulating space, in its compressed footage as indicated by block $N_1$. Therefore, in preferred practice, the footage at which the fibers should be confined in a refrigerator door is less than the critical footage so that it is resiliently held in its chamber. Any degree of compression by confinement, which carries it beyond its elasticity merely adds to the margin of safety.

It follows that with respect to a given maximum compressive force or impact, a fiber mass may be rendered substantially 100% felted and substantially 100% elastic, with stable elasticity. This may be done by subjecting it repeatedly to compression or impact by suitable force until the resistance to it is stabilized. However, the use of the same force or the same impact for repeated applications is not a limitation. Initially, in Fig. 2, the applied force may exceed the maximum ultimate value so long as the felting introduced by such excessive force does not exceed the felting to be attained at station N in Fig. 2. Likewise, in Fig. 3, the initial drops of the cylinder may be at a greater height than shown, so long as the felting thereby introduced is not in excess of the 100% felting desired for the specified felting impact. Use of greater forces in the initial stages aids merely to shorten or hasten the procedure. However, this is not required nor is it desired, because it robs the process of its ease of control and introduces the problem of tapering off the excess of force.

The invention broadly contemplates that initially such excessive force may be used. However, practically, the preferred procedure for testing fiber, and for preparing fiber masses for specifications, is to use repeated compression forces or impacts of the same value.

Broadly, the application of compressive force or of impact to the fiber mass, is the doing of mechanical work on the mass. Mathematically, work is the product of multiplying force by the distance through which it acts. Impact is work.

In the procedure of Fig. 2, the force illustrated is constant, and as the shrinkage of the mass under that force grows less and less, the product of the force and the shrinkage at each application, namely, the work, grows less and less.

In the case of Fig. 3, the impact or work illustrated is constant. But as the shrinkage or settling is less and less at each impact, it follows that the resulting force effective on the fiber must increase, in order that the work be constant. In the impact process, the procedure does not determine or evidence the actual value of the force effective on the fiber, nor the compression of the column resulting from such force. The compression takes place at the moment of impact, and then the spring-back occurs. Obviously the force effective on the fibers increases to a substantially constant value when the settling has substantially approached its limit. This final force may be determined approximately by measuring the maximum permanent spring-back of the column, or the force necessary to be applied to obtain repeatedly the maximum spring-back.

Therefore, in the appended claims the terms referring to "work" contemplate both described methods, as well as other methods. The work is expended in overcoming friction of the fiber mass sliding in its container, in overcoming the instant elasticity, and in felting the fibers. Part of the work of felting may be consumed in bending fibers beyond an elastic limit, or even in breaking fibers. Broadly, work is done on the mass of fibers until the force element of the work just overcomes permanent elasticity and the attendant sliding friction. Work with a force in excess of that, begins to increase the felting and to add transient elasticity.

As an example of other methods contemplated by the present invention Fig. 5 is referred to. A 158 gram sample of wood fibers was placed in a cylindrical container, like that of Fig. 4, but of 8 inches diameter, and compressed by a moving plate advancing at a uniform rate of 1 inch in 32.4 seconds. The apparatus is equipped to release and withdraw the plate to permit immediate spring-back (as described in my copending application Serial No. 313,920, filed January 15, 1940, now U. S. Patent No. 2,325,026, issued July 27, 1943). In the present example, the fiber mass is compressed to 3.15 board-feet per pound in each instance of compression. At this footage the compressing force is read, and the fibers allowed to spring-back to a higher footage, which is also read. This process is repeated until the compressive force and the spring-back footage are substantially constant. As shown in the plot, less than 12 compressions accomplish this.

In Fig. 5 the results are shown on a graph, in which the axis 30 represents the number of the compressions. Axis 31 represents the total compression force in pounds to obtain a footage of 3.15 board-feet per pound. Axis 32 represents the board-feet per pound attained on spring-back. Horizontal line 33 represents the compressed footage of 3.15 board-feet per pound. Line 34 represents the smooth curve on observed points of recorded force at 3.15 footage. Line 35 represents the smooth curve of observed points of spring-back height. The level of line 35 above line 33 represents the spring-back. It is seen that it decreases until it is substantially constant. This shows that a mat has been formed with substantially 100% elasticity and 100% felting for a compression force of 47 pounds at an expanded footage of 4.2 or elastically compressed footage 3.15. The higher initial resiliency evidenced in the earlier compressions reflects the true elasticity and also the capacity of the initial mats to be felted.

Considering the results of Fig. 5 in the terms of work, it is seen that in the end, the final force has become constant, and the distance through which it moves has become constant. Thus a constant amount of work is done on the mass at each compression, and the work is substantially all recovered in the spring-back. Neither the force nor the work is constant in the early part of the process. Originally, with a highest force accompanied by greatest spring-back, there is the greatest input of work. A large fraction of this goes into felting. As the capacity for being felted becomes saturated, less work is performed. The process automatically limits the work, so that in the end, it is just enough to satisfy the 100% resiliency of the resulting mat. The mat is 100% felted with respect to the force which is attained when the 100% resiliency is satisfied on compressing the final mat from footage 4.2 to 3.15.

The product

As the foregoing description indicates, any felted mass of fibers has substantially 100% resiliency to some unknown but determinable force or impact. At such condition, it has also substantially 100% saturation of its capacity to be felted under the said force or impact. Given standard fibers and empirical knowledge of densities and corresponding limits of force or impact therefor, it is easy to select a density to meet specified limits of force or impact. In such case the specifications are not prior, but rather the satisfying density is prior.

Such system is not practically useful, because it is commercially impossible to have standard fibers. Fibers of any given kind vary from time to time and from batch to batch. Measures of these variations are the properties for felting, the elasticity, and the free footage (the density at zero compression). Such properties are described with methods of determination in my copending application Serial No. 313,920, filed January 15, 1940. These are affected by variations in the material of the fiber, the particle size distribution, and any special treatments, sizing or impregnation of the fibers. Two batches of fibers may vary considerably in these properties, which determine the critical densities for critical effects herein described.

Accordingly, the use of a suitable density of one batch of fiber for meeting the critical specifications, is no precedent for choice of that density for another batch of like fibers. For any batch of fibers the specification is prior, and by this invention the density to meet the specifications critically is not prior, but subsequent to the specifications. Given the specifications, and the fiber, the critical density may be determined as herein described.

The present invention therefore reduces uncertainty, guess-work, and waste by over-caution, to a practical certainty, precise measurement, and elimination of waste. For insulation purposes it permits using minimum densities to meet physical requirements, and thereby permits obtaining the best thermal efficiency consistent with such requirements. Heretofore, where very high densities have been used blindly to meet the physical requirements, thermal insulation efficiency has been sacrificed.

The present invention is applicable to many kinds of fibers such as mineral wools, red wood bark, forms of cotton, jute, hair, Kapok, excelsior, and other materials capable of being felted.

In practice it has been successfully demonstrated in use of wood fiber produced by the process of Asplund U. S. Patent No. 2,008,892, wherein the damp product taken directly from the machine is dried to an insulating fiber. In such process the setting of grinding disks may be very slightly varied mechanically, or by wear, to change the particle size distribution of the fiber. Thus, the compressive properties pertinent to the present invention are varied. The invention has also been applied to fractions of such wood fiber and to synthetic mixtures of such fractions. So used it provides a means for compounding or preparting a fiber mass of maximum thermal efficiency for otherwise meeting demanding physical requirements to maintain that efficiency.

Impact resistance

According to the principles herein disclosed, numerous tests may be established as standard to indicate a property of the fiber. The term "impact resistance" has been adopted as such a property for purposes of evaluation of fibers, and it is defined as the board-feet per pound finally attained by a column of fiber when repeatedly subjected to an impact of 1 foot-pound, by dropping the column.

There is considerable experimental error of observation and some variance in reading the so-called substantially constant values at consecutive readings at final conditions. The results are however remarkably accurate and consistent considering the character of apparatus and the heterogeneous character of a fiber mass. Accordingly, in following the present invention it is contemplated that the term "substantially constant" or "substantially 100%" not only express the ideal but also the practical limit, and the claims should be construed accordingly. If a large volume of fiber is at hand there may be error in sampling to be added to the possible errors in testing the specimen. For greater accuracy, several specimens may be tested and the results averaged. Setting materials to limits usually calls for excess caution to give a margin of safety.

Therefore, in meeting a specification wherein a margin of safety is commonly entered, it is practically sufficient to attain 90% of the ideal. In order to illustrate how this may be applied, the disclosed three procedures are discussed with reference to this 90%.

In the repeated application of constant pressure, as in Fig. 2, it is sufficient that either the final volumes $N_1$ or $N_2$ in consecutive compressions agree within 10% one way or the other, or that the expansions between $N_1$ and $N_2$ at successive measurements agree within 10% one way or the other. Where the final figures for one specimen of the same fiber agree within 10% with the final figure for another specimen of the same fiber, the results are considered to be within the invention. Such specimens so checked are considered in the circumstances to be substantially constant or substantially 100% completed.

In the impact procedure as in Fig. 3, the final volume readings at consecutive drops of the curve formed, may agree within 10% of each other, one way or the other, and be considered substantially constant or substantially 100% completed. Thus for example in curve 28, the last two plotted readings are actually 3.8 and 3.75, which agree within 1.5%. On another specimen an attempt to duplicate curve 28 might give final readings checking within the curve as close as that 1.5% but falling above or below the level of curve 28 with a variance as much as 10%.

In the constant volume compression of Fig. 5, it is seen by the plot that actually the values for curve 34 at the 5th and 6th drops show deviation from the smooth curve. The readings were 58 and 50 pounds. This is a deviation of 13.8% or 16% depending on the base taken, and it is indicated by the curve that the process has not reached an equilibrium condition. Reproducing curves 34 and 35 with another specimen might give results differing from those shown, but an agreement within 10% is considered acceptable and within the scope of the present invention.

In the processes above described the repetitive steps alter the characteristics of the fiber mass by addition, with increments of density, of felting, and of elasticity, and by substraction, by decrements of volume, and of spring-back. These increments and decrements gradually approach zero as the repetition progresses to constancy of result, and the processing is complete where the increments and decrements are substantially zero.

It is therefore believed that after reading and understanding the invention, and appreciating the factors which may alter results, one may follow the teachings hereof, and achieve the desired results with an accuracy from 90% to 100%, however the basis for such percentage is taken.

From the foregoing it will be appreciated that the invention has several aspects, and that various modifications may be practiced, without departing from the invention as expressed in the appended claims.

I claim:
1. The method of testing fibers to determine the minimum non-settling density thereof with respect to a pre-determined maximum impact, which comprises subjecting a mass of said fibers to repeated impacts of said predetermined maximum until no further change in the free volume of the mass is effected by the repetition, and measuring the resulting settled density.

2. The method of testing fibers to determine the minimum density thereof to resist movement under an impact of predetermined maximum value, which comprises subjecting a mass of said fibers to repeated impacts of said predetermined maximum until no further change in the free volume of the mass is effected by the repetition, and measuring the density of the resulting settled mass when compressed to its elastic limit.

3. The method of testing fibers to determine the minimum non-settling density thereof with respect to a predetermined maximum compression force, which comprises subjecting a specimen of the fibers to repeated compressions by said predetermined maximum force until a substantially constant volume is attained on removal of the compression at repeated applications, and determining the density of the resulting mass.

4. The method of making an ultimate resilient felted mass of dry fiber which mass has an uncompressed fixed density, which mass is responsive resiliently to compression forces up to a predetermined magnitude of pressure, and which mass is responsive to a pressure of greater magnitude by being additionally felted to an uncompressed density greater than said fixed density, which method comprises as a first operation doing mechanical work on an initial mass of dry fibers which initial mass has an uncompressed density less than said fixed density, said work effecting a compression beyond the elastic limit of said initial mass whereby the felting of the mass is increased toward but not in excess of the degree of felting of the ultimate mass to be formed; expanding the compressed mass to exert available elasticity therein whereby to form a resulting mass having an uncompressed density greater than that of said initial mass and less than that of said ultimate mass, and repeating the said compression and expansion a plurality of times on the successive resulting masses, whereby in the repetition the resulting masses of the fiber become additionally felted and have greater uncompressed density by increments of both felting and uncompressed density which increments decrease and approach zero, and ceasing said repetition when said increments are substantially zero, whereby the resulting mass is said ultimate mass.

5. The method of making an ultimate resilient felted mass of dry fiber which mass has an uncompressed fixed density, which mass is responsive resiliently to compression forces up to a predetermined magnitude of pressure, and which mass is responsive to a pressure of greater magnitude by being additionally felted to an uncompressed density greater than said fixed density, which method comprises subjecting to repeated impacts an initial mass of dry fibers which initial mass has an uncompressed density less than the said fixed density, said impacts being of the same value and such that said ultimate mass is stable against further felting and further increase in uncompressed density under such impact, whereby as the impacts are repeated the resulting masses of the fiber become additionally felted and have greater uncompressed density by increments of both felting and uncompressed density which increments decrease and approach zero, and ceasing said repetition when said increments are substantially zero, whereby said ultimate mass is formed.

6. The method of making an ultimate resilient felted mass of dry fiber which mass has an uncompressed fixed density, which mass is responsive resiliently to compression forces up to a predetermined magnitude of pressure, and which mass is responsive to a pressure of greater magnitude by being additionally felted to an uncompressed density greater than said fixed density, which method comprises subjecting to repeated applications of and releases from a compressing pressure of the same magnitude an initial mass of dry fibers having an uncompressed density less than said fixed density, the magnitude of said pressure being such that said ultimate mass is stable against further felting and further increase in uncompressed density under the action of said pressure, whereby as the compressions and releases are repeated the resulting masses of said fiber become additionally felted and have greater uncompressed density by increments of both felting and uncompressed density which increments decrease and approach zero, and ceasing said repetition when said increments are substantially zero, whereby said ultimate mass is formed.

7. The method of making an ultimate resilient felted mass of dry fiber which mass has an uncompressed fixed density, which mass is responsive resiliently to compression forces up to a predetermined magnitude of pressure, and which mass is responsive to a pressure of greater magnitude by being additionally felted to an uncompressed density greater than said fixed density, which method comprises subjecting to repeated compressions to the same ultimate volume and repeated releases an initial mass of dry fibers having an uncompressed density less than said fixed density, the said volume being that at which the said ultimate mass is compressed to its elastic limit and to a density beyond which further compression produces additional felting and an uncompressed density greater than said fixed density, whereby as said compressions and releases are repeated the resulting masses of the said fibers become additionally felted and have greater uncompressed density by increments of both felting and uncompressed density which increments decrease and approach zero, and ceasing said repetition when said increments are substantially zero, whereby said ultimate mass is formed.

8. The method of making a felted and still-feltable ultimate mass of dry fibers characterized by resiliency in slight compression and by a fixed uncompressed density, which comprises subjecting to repeated compressions to the same ultimate compressed volume and repeated releases therefrom an initial mass of dry fibers having an uncompressed density less than said fixed density, whereby upon each release the said compressed volume expands to a corresponding uncompressed volume, said compressions being each beyond the elastic limit of each mass compressed whereby felting in the resulting masses is increased by increments which approach zero, and whereby the forces exerted in attaining said volume gradually decrease by decrements which approach zero, and whereby the said uncompressed volumes after the releases decrease by decrements which approach zero, and ceasing said repetition when said decrements are substantially zero.

9. A mat of dry fibers resulting from the process of claim 4.

10. A mat of dry fibers resulting from the process of claim 5.

11. A mat of dry fibers resulting from the process of claim 6.

12. A mat of dry fibers resulting from the process of claim 7.

13. A mat of dry fibers resulting from the process of claim 8.

14. The method of producing thermal insulation of felted dry fibers in a body having a space to receive insulating fibers, while preventing danger of settling of the fibers in said space by impacts in magnitude less than and equal to an impact of a predetermined maximum value, which comprises providing a uniform supply of fibers in bulk form which fibers felt on packing, said bulk form being such that the bulk requires packing and densifying to provide said mass, subjecting a representative specimen of fiber selected from said uniform supply to the process of claim 5, wherein the value of the impacts is the said predetermined maximum value, determining the uncompressed density of the resulting ultimate mass of fibers, and packing a representative mass of fibers derived from said supply into said space at a density equal to said determined density, whereby said packed fiber is permanently non-settling under impacts of value not in excess of said predetermined maximum value.

15. The method of producing thermal insulation of felted dry fibers in a body having a space to receive insulating fibers, while preventing danger of densification of the mass of fibers in said space under the influence of compressing forces in magnitude less than and equal to a force of a predetermined maximum value in pressure, which comprises providing a uniform supply of fibers in bulk form which fibers felt on packing, said bulk form being such that the bulk requires packing and densifying to provide said means, subjecting a representative specimen of fibers selected from said uniform supply to the process of claim 6 wherein the pressure employed is said predetermined maximum pressure, determining the uncompressed density of the resulting ultimate mass of fibers, and packing a representative mass of fibers selected from said supply into said space at a density equal to said determined density.

HERMAN W. ANWAY.